United States Patent [19]
Joffrion

[11] 4,251,644
[45] Feb. 17, 1981

[54] POLAR RESINS HAVING IMPROVED CHARACTERISTICS BY BLENDING WITH EPM AND EPDM POLYMERS

[75] Inventor: Ralph K. Joffrion, Baton Rouge, La.

[73] Assignee: Copolymer Rubber & Chemical Corporation, Baton Rouge, La.

[21] Appl. No.: 80,652

[22] Filed: Oct. 1, 1979

[51] Int. Cl.$^3$ .................. C08L 23/36; C08L 51/04; C08L 23/16
[52] U.S. Cl. .............................. 525/64; 525/66; 525/176; 525/177; 525/175; 525/183; 525/184
[58] Field of Search .................. 525/64, 66, 176, 177, 525/183, 184

[56] References Cited

U.S. PATENT DOCUMENTS

| 3,974,234 | 8/1976 | Brinkmann et al. | 525/66 |
| 4,100,224 | 7/1978 | Hess et al. | 525/64 |

Primary Examiner—Carman J. Seccuro
Attorney, Agent, or Firm—McDougall, Hersh & Scott

[57] ABSTRACT

The improvement of physical and mechanical properties of polar resins such as nylon and dacron resins by blending with EPM and EPDM resins which have been rendered more compatible by the modification to incorporate polar groups.

6 Claims, No Drawings

POLAR RESINS HAVING IMPROVED CHARACTERISTICS BY BLENDING WITH EPM AND EPDM POLYMERS

This invention relates to blends of EPM and EPDM polymers with other synthetic polymeric resinous materials to provide improved physical and mechanical properties such as improved impact strength, tensil strength, toughness, flexure and the like.

Considerable benefit has been derived from the blending of EPM and EPDM polymers with plastic materials such as polyethylene, polypropylene, polybutadiene and other polymers formed by the addition and polymerization of monoolefins and polyenes. There are, however, a number of synthetic resinous materials, such as polyamides (nylon), polyesters (dacron) and the like, with which improvements in physical and mechanical properties could be achieved if compatibility could be improved between such resinous materials and EPM and EPDM polymers so as to enable suitable blends to be formed thereof wherein desirable properties of one could be contributative to the other to produce composites having new and improved characteristics.

It is an object of this invention to produce blends of polyamides, polyesters and other polar polymers with EPM or EPDM polymers wherein the blends have improved physical and mechanical properties and it is a related object to produce and to provide a method for producing EPM and EPDM polymers provided with polar groupings that improve compatibility with such polar polymers.

It has been found, in accordance with the practice of this invention, that the compatibility between EPM and EPDM polymers with polar polymers such as polyamides, polyesters and the like, can be greatly improved by the fabrication of EPM and EPDM polymers to incorporate highly polar groups such as amine groups, amide groups, thio groups, ether groups, ester groups and the like highly polar groupings. Such grouping can be incorporated into the EPM or EPDM polymers by reaction during the polymerization to form the EPM or EPDM polymers by including the polymerizable monomer as a third monomer in the preparation of an EPM polymer or as a fourth monomer in the preparation of an EPDM polymer, wherein the monomer contains a polar grouping of the type described in addition to the unsaturated carbon-to-carbon linkage required for copolymerization with the polymerizable monomers for forming the EPM or EPDM polymers. It is preferred, however, to incorporate the polar group into an already formed EPM or EPDM polymer as by reaction to graft a compound or a monomer containing such highly polar grouping onto an already formed EPM or EPDM polymer. By the grafting reaction, greater flexibility exists in the preparation of the EPM or EPDM polymer from the standpoint of the reaction conditions and molecular weight, and greater breadth can be practiced with respect to the selection of functional groups grafted onto the EPM or EPDM polymer, thereby to expand the polar polymers with which the modified EPM or EPDM can be blended and the properties of the blands that are formed.

The invention will be described with reference to the use of dimethylamino ethyl methacrylic as the monomer incorporated into the EPM or EPDM as by interpolymerization or by grafting onto already formed EPM or EPDM polymers. It will be understood that the dimethylamino ethyl methacrylic can be replaced in corresponding amounts with dimethylamino ethylacrylate, diethylamino ethyl methacrylate, diethylamino ethylacrylate, methyl vinyl pyridine, vinyl pyridine or other monolic can be replaced in corresponding amounts with other monomers containing polar groupings and preferably one or more carbon to carbon double bonds, as required for interpolymerization and preferably where the polar group is embodied in a compound grafted onto an already formed EPM or EPDM polymer.

EPM polymers are formed by interpolymerization of monomers of ethylene and one or more higher monoolefins having from 3 to 16 carbon atoms, preferably propylene. EPDM interpolymers are formed of the same ethylene, one or more higher monoolefins as described above, plus one or more polyenes.

The polyene or other ethylenically unsaturated compound containing a plurality of carbon-to-carbon double bonds may be selected from those disclosed in the prior art for use as third monomers in the preparation of ethylene-propylene-polyene terpolymers, including open chain polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo (2,2,1) heptane wherein at least one doublebond is present in one of the bridged rings, such as dicyclopentadiene, bicyclo (2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo(2,2,2) octane as represented by bicyclo(2,2,2) octa-2,5-diene, polyunsaturated derivatives of bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isopropylidene-2-norbornene, 5-n-butylidene-2-norbornene, 5-isobutylidene-2-norbornene, dicyclopentadienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The elastomer may contain chemically bound therein molar ratios of ethylene to propylene varying between 95:10 ethylene to 5:90 propylene, and preferably between 70:30 ethylene to 55:45 propylene. The polyene or substituted polyene may be chemically bound therein to replace the ethylene or propylene in an amount of 0.1 to 10 mole percent, and preferably 0.3 to 1 mole percent, or in an amount to provide an actual unsaturation level of 2 double bonds per 1,000 carbon atoms in the polymer chain to unsaturation level as high as 100 double bonds per 1,000 carbon atoms in the polymer, but it is preferred to make use of the third monomer in the form of a polyene in an amount to provide an unsaturation level within the range of 2.5 to 10 carbon-to-carbon double bonds per 1,000 carbon atoms in the interpolymer.

The interpolymerization reaction is carried out in the presence of a catalyst in a solvent medium. The polymerization solvent may be any suitable inert organic solvent that is liquid under reaction conditions and it may be a prior art solvent for solution polymerization of monoolefins in the presence of Ziegler type catalyst. Examples of satisfactory hydrocarbon solvent include straight chain paraffins having from 5–8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5–6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler type catalyst used in the polymerization reacton.

Ziegler catalysts of the type well known to the prior art may be used. Such Ziegler type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organometallic compound of a metal of groups I, II or III of the Mendeleeff periodic system which contains at least one carbonmetal bond, such as trialkyl aluminum, and allyl aluminum halides in which the alkyl groups contain from 1–20 and preferably 1–4 carbon atoms.

The preferred Ziegler catalyst for interpolymerization to produce EPM or EPDM polymers is prepared from a vanadium compound and an alkyl aluminum halide. Examples of suitable vanadium compounds include vanadium trichloride, vanadium tetrachloride, vanadium oxychloride, vanadium acetyl acetonate, et. Activators which are especially preferred include alkyl aluminum chlorides of 3,113,115, general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mole ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organo-metallic compounds of groups I, II or III for the aluminum compounds. A catalyst prepared from alkyl aluminum sesquichloride, such as the methyl or ethyl aluminum sesquechloride and vanadium oxychloride is preferred in the ratio of 1 mole vanadium oxychloride per 5–300 moles of aluminum and more preferably 15–60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator.

EXAMPLE 1

This example will illustrate the copolymerization of dimethylamino ethyl methacrylic monomer as the third monomer in the preparation of EPM polymer.

A dry, 7-ounce flask containing 100 cc of dry hexane was flushed with nitrogen gas and was fitted with a self-sealing syringe cap. The hexane was flushed with propylene and then pressured to 15 pounds per square inch with propylene. The flask was brought to 25 pounds total monomer pressure by addition from a feed tank containing 65 mole percent ethylene and 35 mole percent propylene. The polymerization was performed in a 35° C. water bath. To the flask was added 0.02 mM of butyl perchlorocrotonate, 0.05 mM of dimethylamino ethyl methacrylic, 0.15 mM of ethyl aluminum sesquichloride and 0.00375 mM of vanadium oxytrichloride. As the polymerization proceeded, the monomer composition was maintained constant by continual addition from the feed tank. At 5 minute and at 6 minute intervals, the above reactants were again charged to the flask. The cement that was formed after 15 minutes was stopped by incorporating into the cement 1 ml of water to precipitate the polymer from the solution. The polymer that was recovered by steam coagulation and dried in an vacuum oven at 75° C. was a low molecular weight EPDM polymer containing occasional third monomers bonded therein.

EXAMPLE 2

This example will illustrate the copolymerization of dimethylamino ethyl methacrylic as a fourth monomer in the preparation of a grafted EPDM polymer.

A dry flask was first flushed with nitrogen gas and filled with 100 cc of dry hexane which was flushed with polymerization grade propylene and pressured to 15 p.s.i.g. with propylene. The flask was brought to 25 p.s.i.g. total molecular pressure by addition from a feed tank containing 65 mole percent ethylene and 35 mole percent propylene. Polymerization was carried out in a water bath maintained at 35° C. Additions were made to the flask of 0.02 mM butyl perchlorocrotonate, 1.45 mM of dimethylamino ethyl methacrylic, 0.3 mM ethyl aluminum sesquichloride and 0.005 mM vanadium oxytrichloride.

As the polymerization proceeded, the monomer composition in ethylene and propylene was maintained constant by continuous addition from the feed tank. At 300 seconds and again at 600 seconds, 0.58 mM of dimethylamino ethyl methacrylic, 0.02 mM butylperchlorocrotonate, 0.18 mM ethyl aluminum sesquichloride and 0.005 mM vanadium oxytrichloride were charged to the flask and at 900 seconds 1.0 cc isopropanol containing 0.05 g. of Irganox 100 was added. The polymer cement was mixed with water to remove the catalyst. The polymer was precipitated from solution with 150 cc isopropanol. After drying in a vacuum oven at 75° C. for 12 hours, the resulting grafted EPDM polymer was clear and gel free.

EXAMPLE 3

This example will illustrate the grafting of the dimethylamino ethyl methacrylic onto an already formed EPDM polymer.

In a reactor, 1 liter of hexane was introduced and as the temperature was raised to 30° C., dry propylene was fed to the reactor until 42.2 inches of mercury pressure was reached. The pressure was then raised to 61 inches of mercury with a feed of dry ethylene and 6.03 millimoles of dimethylamino ethyl methacrylic, and 1 cc of 1.5 molar ethylene aluminum sesquichloride.

The monomer feeds were stopped and 0.545 molar solution of ethyl aluminum sesquichloride and 0.054 molar solution of vanadium oxytrichloride, at a 12 to 1 aluminum to vanadium ratio, were fed into the reactor at a constant rate until a pressure drop was noted. At this time, the gaseous monomers were fed into the reactor at a rate of 1500 cc per minute of which 690 cc were ethylene and 810 cc were propylene. 5-ethylidene-2-norbornene was added as a third monomer in the form of 0.3 molar solution in hexane which also was 0.01 molar in pyridine, at a rate of 3.57 cc per minute. The polymerization was controlled by the addition of catalyst on demand in response to increased pressure. When the polymerization has been completed, the cement is drawn from the polymerization vessel and the catalyst is killed by the addition of water, and the admixture was subjected to high agitation to transfer the catalyst to the water phase. The mixture is then led to a decanter wherein the water phase is separated from the solvent phase containing 10% by weight of the EPDM polymer in hexane.

The cement is concentrated by flashing off water and unreacted monomer and some of the solvent to increase the concentration of the polymer to 15–25%, and the concentrate is then heated to a temperature of 300°–305° F. and 280 p.s.i.g. before advancement to a mixture wherein the dimethylamino ethyl methacrylic is introduced in the ratio of 1–5 parts by weight per 1 part by weight polymer in the solution.

Addition is made of a catalyst in the form of a peroxide catalyst such as dibutyl peroxide in the ratio of 1 part by weight of catalyst to 2 parts by weight of the monomer and then the mixture is advanced to a reactor wherein the dimethylamino ethyl methacrylic is grafted onto the polymer at a temperature of about 300°–305° F. and 20 p.s.i.g. The solvent is removed by deflashing or by distillation to yield a grafted EPDM polymer of low molecular weight.

EXAMPLE 4

This example will illustrate the grafting of dimethylamino ethyl methacrylic onto an EPM polymer of low molecular weight.

Into the reactor, ethylene at a rate of 17.6 lb./hr., propylene at a rate of 62.3 lb./hr., and hexane at a rate of 567 lbs./hr. are introduced with vanadium oxytrichloride catalyst at a rate of 0.063 lb./hr., ethyl aluminum sesquichloride co-catalyst at a rate of 2 lb./hr. and butyl perchlorocrotonate promoter at a rate of 0.25 lb./hr. until a temperature of 60° C. at 40 p.s.i.g. is reached to produce a low molecular weight EPM containing approximately 41 mole percent ethylene and 59 mole percent propylene bound in the polymer.

The dimethylamino ethyl methacrylic is grafted onto the formed EPM polymer as in example 3.

EXAMPLE 5

This example will illustrate the grafting of the dimethylamino ethyl methacrylic onto a solid rubbery EPM polymer after it has been formed and separated from its reaction medium.

To a 500 ml. 3-necked flask, addition was made of 120 g. of benzene heated to 80° C. and 30 g. of a 60/40 mole percent ethylene/propylene EPM copolymer in the form of small pieces. The materials were heated and stirred until the polymer was dissolved and then 3 g. of dimethylamino ethyl methacrylic was added. Dicyclohexyperoxydicarbonate was added in an amount of 0.3 g. dissolved in 0.7 g. of benzene over a period of ½ hour and then the temperature was raised to above the decomposition temperature for the catalyst or to a temperature of about 140° C. After about 30–40 minutes, the catalyst was added in a further amount of 1.3 g. and the reaction was thereafter completed within 1 hour. The unreacted monomer and other volatiles were then removed by vacuum distillation to yield an EPM polymer grafted with dimethylamino ethyl methacrylic.

The dimethylamino ethyl methacrylic in examples 1–5 may be substituted in equivalent amounts with other unsaturated monomers containing polar groups such as vinylimidazole, N-vinylcarbazole, N-vinylsuccinimide, acrylonitrile, o-,m- or p-aminostyrene, maleimide, N-vinyl ozazolidone, N,N-dimethylaminoethyl vinyl ether, ethyl 2-cyanoacrylate, vinyl acetonitrile, N-vinylphthalimide, and 2-vinylquinoline; a variety of acrylamides and methacrylamides such as N-[1,1-dimethyl-3-oxobutyl] acrylamide, N-[dimethyl-1-ethyl-e-oxobutyl] acrylamide, N-(1,3-diphenyl-1-methyl-3-oxopropyl) acrylamide, N-(methyl-1-phenyl-3-oxobutyl)methacrylamide, N,N-diethylaminoethylacrylamide; and 2-hydroxyethyl acrylamide. A variety of N-vinylcaprolactams or their thioanalogs, such as N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted 1-vinylpyrrolidones; N-vinylbenzyldimethylamine, N-dimethylaminopropyl acrylamide and methacrylamide, N-methacryloxyethylpyrrolidone, N-methacryloxyethylmorpholinone, N-methacryloxyethylmorpholine, N-maleimide of dimethylaminopropylamine, and the N-methacrylamide of aminoethyethylneurea, methyl vinyl pyridine and vinyl pyridine.

In the examples 3, 4 and 5 wherein the polar groups are incorporated by grafting onto already formed EPM or EPDM polymers, the polar groups may be embodied in a compound other than an unsaturated monomer for grafting onto EPM or EPDM polymers, as described in the aforementioned copending application filed concurrently herewith.

In the foregoing examples, the term "dimethylamino ethyl methacrylic" is meant to include "dimethylamino ethyl methacrylic acid" as well as "dimethylamino ethyl methacrylate" or other "dimethylamino ethyl alkylacrylates".

The modified EPM or EPDM polymer can be blended with the described polar resin, such as a polyamide resin (nylon) or a polyester resin (dacron) in the ratio of 1-50 parts by weight modified EPM or EPDM per 99-50 parts by weight of the polar resin and preferably in the ratio of 2-20 parts by weight modified EPM or EPDM per 98-80 parts by weight of the polar resin. The blends can be fabricated by admixture of the polymers while in a plastic or molten state, such as in a Banbury mill, roller mill, extrusion machine or the like processing equipment.

The following will illustrate blends formed in accordance with the practice of this invention and the resulting properties thereof.

I claim:

1. A polar resin selected from the group consisting of polyamides and polyester resins having improved physical and mechanical properties comprising a blend of the polar resin with up to 50% by weight of an EPM or EPDM polymer which has been rendered more compatible with the polar resin by having incorporated therein polar groups as a monomer bound in the polymer by copolymerization with the EPM or EPDM monomers or grafted onto the EPM or EPDM polymer after formation thereof in which the polar groups are an amine or an amide group.

2. The method of blending an EPM or EPDM resin with a polar resin selected from the group consisting of polyamides and polyester resins to form a composite having improved mechanical and physical properties comprising improving the compatibility of the EPM or EPDM resin with the polar resin by incorporating into the EPM or EPDM resin highly polar groups selected from the group consisting of amine and amide groups, and reducing the EPM or EPDM resin and the polar resin to a plastic stage and admixing the modifying EPM or EPDM with the polar resin while in their plastic stage to produce a blend of the polymeric resinous materials.

3. The method as claimed in claim 2 in which the polar groups are incorporated into the EPM or EPDM resin by copolymerization of the monomers during the formation of the EPM or EPDM resin with the monomer containing the polar grouping whereby the monomer becomes bound in the EPM or EPDM polymer.

4. The method as claimed in claim 3 in which the polarized EPM or EPDM polymer is incorporated in the polymer resin in an amount up to 50% by weight.

5. The method as claimed in claim 2 in which the polar group is incorporated into the EPM or EPDM resin by the grafting of a compound containing the polar group onto an already formed EPM or EPDM resin.

6. The method as claimed in claim 2 in which the modified EPM or EPDM is blended with the polar resin in the ratio of 2-20 parts by weight of the modified EPM or EPDM per 98-80 parts by weight of the polar resin.

* * * * *